United States Patent Office

2,892,860
Patented June 30, 1959

2,892,860

CORROSION INHIBITOR FOR OIL TANKER WATER BALLAST

Stanley M. Pier, Wappingers Falls, N.Y., assignor to Texaco Inc., a corporation of Delaware No Drawing. Application April 16, 1956
Serial No. 578,549

17 Claims. (Cl. 260—452)

This invention relates to wax oxidates produced by the oxidation of petroleum wax and, more particularly, to the salts obtained from the reaction of such wax oxidates with quaternary ammonium compounds. The invention also concerns employing such salts to prevent the corrosion of metals by aqueous liquids.

Broadly, this invention contemplates the preparation of wax oxidate salts obtained by reacting a wax oxidate, having an acid No. above about 190 and an acid No. to saponification No. ratio greater than 0.6, with a quaternary ammonium compound represented by the formula:

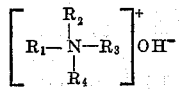

in which $R_1$, $R_2$, $R_3$, and $R_4$ are the same or different radicals selected from the group consisting of alkyl, aryl, aralkyl, and alkaryl radicals having 1 to 20 carbon atoms.

The quaternary ammonium salts of these wax oxidates have been found to be particularly valuable in inhibiting the corrosion of metallic bodies, such as is found in brine-ballasted oil tankers, storage tanks, pipe lines and, particularly, the corrosion of steel pipes induced by oil well condensates. These quaternary ammonium waxate compositions have also been observed to have a bactericidal effect on certain sulfate-forming bacteria which are known to aggravate corrosion of steel and other metallic bodies. Since the waxate salts are soluble in alcohols, such as monohydric and polyhydric alcohols, they are also useful as corrosion inhibitors in antifreeze solutions for automotive and other types of cooling systems.

The waxes employed in the preparation of the wax oxidates are macrocrystalline paraffin waxes, typically 125–127° F. melting point deoiled semi-refined waxes containing less than 5% oil. Macrocrystalline paraffin waxes are characterized by consisting principally of straight chain hydrocarbons in which the molecules range from about 20 to 33 carbon atoms in length with the average length between about 25 and 30 carbon atoms.

The wax oxidates employed in the invention are prepared by oxidizing a semi-refined or deoiled macrocrystalline paraffin wax under controlled conditions. In general, such a process involves reacting a deoiled paraffin wax with air in the presence of a catalyst at an air feed rate of 10 to 50 cubic feet per lb. of paraffin wax per hour, at a temperature between 230 and 290° F., and at a pressure of 30 to 300 lbs. per sq. inch. The deoiled paraffin wax should contain less than about 5% oil and is preferably oxidized in the presence of a potassium permanganate catalyst at an air feed rate of 20 to 40 cubic feet per lb. of paraffin wax per hour, at a temperature between 240 and 270° F., and a pressure between 50 and 200 lbs. per sq. inch. Employing these conditions, there is obtained in about 8 hours a crude wax oxidate product having an acid No. above about 190 and an acid No. to saponification No. ratio of about 0.6 or higher.

The crude wax oxidate produced by the above method may be directly reacted with quaternary ammonium compounds to form therein the desired wax oxidate salts. Products of such a direct reaction have been prepared and are known to possess the corrosion inhibiting and bactericidal properties disclosed above. In addition, it is frequently desirable to wash or treat the crude wax oxidate product with various solvents to remove insolubles and provide a higher concentration of wax acids, thus providing a portion exhibiting optimum properties for reaction with the quaternary ammonium compounds. Thus, for example, it may be desirable to treat the crude wax oxidate with a petroleum solvent, such as naphtha, to separate the naphtha-insoluble portion from the oxidized wax.

The quaternary ammonium compounds employed in the reaction with wax oxidates may be represented by the formula:

in which $R_1$, $R_2$, $R_3$ and $R_4$ are selected from the group consisting of alkyl, aryl, aralkyl and alkaryl radicals having 1 to 20 carbon atoms. Quaternary ammonium compounds typical of this class include benzyltrimethylammonium hydroxide, tetraethylammonium hydroxide, butyltrimethylammonium hydroxide, phenyltrimethylammonium hydroxide, octyltrimethylammonium hydroxide, and tolyltrimethylammonium hydroxide.

The wax oxidate salts or quaternary ammonium salts of oxidized wax are prepared by reacting a quaternary ammonium compound with a wax oxidate at a temperature between about 212° F. to about 280° F. until the reaction has been completed. The reaction is essentially a neutralization reaction wherein the ammonium ion of the quaternary ammonium base replaces the hydrogen of the wax acids thereby resulting in the formation of a salt and the splitting off of water. Under the conditions of reaction, the water is volatilized from the reaction mixture. The quaternary ammonium salt products of this reaction will be characterized by having a nitrogen content of about 2.5% to 4%.

As commonly understood, the term "Acid No." is the numerical value of the acidity expressed in milligrams of KOH per gram of substance. This is also known as the "neutralization number." The term "saponification No." is the number of milligrams of KOH consumed by one gram of the material under conditions required to convert all of the acidic materials to the corresponding soaps.

The following examples illustrate the preparation of wax oxidates and salts thereof and show the corrosion inhibiting and bactericidal properties of the wax oxidate salt products.

EXAMPLE I

Preparation of wax oxidate 150 lbs. of refined macrocrystalline wax, obtained by sweating and pressing an unpressed paraffin distillate, was charged to an aluminum reactor. This wax had the following properties:

| | |
|---|---:|
| Flash, O. Cleve. ° F | 415 |
| Fire, Cleve. ° F | 460 |
| Visc. Say. Univ. at 210° F | 37.1 |
| English melting point | 126.6 |
| Oil, percent ASTM | 0.8 |

There was also charged to the reactor an aqueous solution prepared by dissolving 0.6 lbs. of potassium permanganate in 10 lbs. of water. Air blowing was initiated as soon as the total charge mixture was introduced into the reactor. The reaction mixture was rapidly heated to a temperature of about 340° F. by heat exchange in order to initiate the reaction. After initiation of the reaction was indicated by the evolution of heat, the reaction mass was rapidly cooled to a temperature of 270° F. During the injection period, the pressure was adjusted to 80 p.s.i.a. and the air rate to 20 cu. ft. of air per lb. of wax per hour. This reaction was continued for 4.7 hours. The wax oxidate product obtained was characterized by the following tests:

| | |
|---|---|
| Acid No. | 195 |
| Saponification No. | 312 |
| Gravity, ° API | 16.7 |
| Visc. Say. Univ. at 210° F. | 59.4 |
| Petrolatum melting point, ° F. | 108.8 |
| Ratio, acid No./sap. No. | 0.63 |

Wax oxidates prepared in the above manner will generally have a range of properties depending upon the particular wax stock initially employed. In general, the acid No. will range between about 190 to 300 and the ratio of acid No. to saponification No. will range between about 0.6 and about 0.7.

EXAMPLE II

Preparation of wax oxidate salt 100 grams of the naphtha soluble portion of a wax oxidate having an acid No. of about 198 and a saponification No. of about 306 were reacted with 147 grams of a 40% aqueous solution of benzyltrimethylammonium hydroxide. The reaction was carried out by mixing the wax oxidate with the quaternary ammonium compound and heating them at 212 to 248° F. Under these conditions, the water split off in the reaction was flashed overhead. The product consisted of two phases, a small amount of a water-white phase which set to a hard wax at room temperature and a brown liquid phase which was the desired material and which set to a soft wax at room temperature. The brown product contained 3.05% nitrogen and had an acid No. of 33.

EXAMPLE III

Preparation of wax oxidate salt 300 grams of a wax oxidate having an acid No. of about 198 and a saponification No. of about 306 were reacted with 600 grams of a 40% aqueous solution of benzyltrimethylammonium hydroxide. This reaction was conducted at 230 to 257° F. The brownish wax oxidate salt produced was found to contain 3.28% nitrogen and to have an acid No. of 3.

EXAMPLE IV

The composition prepared in Example III was tested for its corrosion inhibiting properties in a simulated condensate well corrosion test. The test was conducted in beakers containing synthetic sea water acidified with enough acetic acid to give a pH of 3.5. The benzyltrimethylammonium waxate was dissolved in alcohol to form a 25% solution which was added to the test water in an amount corresponding to an injection rate of 2.0 gallons per day based on a brine production of 0.5 bbls./day/injection well and actually amounting to 28.7 cc. of the solution in a total volume of 330 cc.

A standard steel rod was placed in the beaker in contact with the inhibited brine solution. The test beakers were placed in a bath maintained at 115° F. while the contents were mechanically agitated. A blank similar in all respects to the test sample was run with the exception that no inhibitor had been added. The test conditions were maintained for 3 hours after which time the iron content of the solutions was determined as a measure of the extent of corrosion of the rod.

In one test the iron content of the brine containing the benzyltrimethylammonium waxate amounted to only 13 parts per million. The blank run under identical conditions but without the inhibitor contained 96 parts per million of iron.

In another test the brine solution containing the benzyltrimethylammonium waxate had an iron content of only 2 parts per million. A blank brine solution run under identical conditions was found to have 116 parts per million of dissolved iron.

EXAMPLE V

The effect of benzyltrimethylammonium waxate as a bactericide for inhibiting the development of sulfate-reducing bacteria, and consequently reducing metal corrosion by $H_2S$, was determined. The test is based on the fact that anerobic sulfate-reducing bacteria (desulfovibrio desulfuricans) under favorable conditions will reduce sulfates to sulfides including hydrogen sulfide which is highly corrosive to metals.

Test bottles containing a culture medium on which the sulfate-reducing bacteria normally thrives are prepared for the test. The culture medium employed contains a small amount of ferrous sulfate uniformly dispersed therein.

In conducting the test, small amounts of the bactericide, the amount generally given as parts per million of the total medium, are introduced into the test bottles. Thereafter, the test bottles are inoculated with standard amounts of the sulfate-reducing bacteria and then permitted to stand for 30 days before the results of the test are observed.

If the bactericide is not effective, the bacteria will reduce the ferrous sulfate to ferrous sulfide. Since ferrous sulfide is black, any production of ferrous sulfide in the culture medium will be immediately apparent. On the other hand, if the bactericide is effective there will be no blackening of the medium after standing 30 days.

The benzyltrimethylammonium waxate prepared in Example III was introduced into bottles of culture medium containing ferrous sulfate at concentrations of 5 and 10 parts of waxate per million parts of the total medium. The test bottles were then inoculated with standard amounts of sulfate-reducing bacteria. At 10 parts per million the benzyltrimethylammonium waxate was found effective to prevent the development of the sulfate-reducing bacteria. These results from such small concentrations of the waxate composition indicate that it is an excellent corrosion inhibitor for minimizing or preventing corrosion by salt water from gas condensate wells containing sulfate-reducing bacteria. Generally, concentrations between about 10 and 100 parts per million will be found suitable for bactericidal applications.

Obviously, many modifications and variations of the invention as hereinbefore set forth may be made without departing from the spirit and scope thereof and, therefore, only such limitations should be imposed as are indicated in the appended claims.

I claim:

1. A wax oxidate salt characterized by having a nitrogen content from about 2.5% to 4% prepared by reacting a paraffin wax oxidate, said oxidate having an acid No. above about 190 and an acid No. to saponification No. ratio greater than about 0.6, with a quaternary ammonium hydroxide represented by the formula:

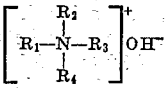

in which $R_1$, $R_2$, $R_3$ and $R_4$ are radicals selected from the group consisting of alkyl, aryl, aralkyl, and alkaryl radicals having 1 to 20 carbon atoms at a temperature sufficient to volatilize water from the reaction mixture.

2. A wax oxidate salt characterized by having a nitrogen content from about 2.5% to 4% prepared by substantially neutralizing a paraffin wax oxidate at a temperature from about 212° F. to about 280 ° F., said oxidate having an acid No. above about 190, and an acid No. to saponification No. ratio greater than about 0.6, with a quaternary ammonium hydroxide represented by the formula:

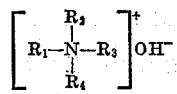

in which $R_1$, $R_2$, $R_3$, and $R_4$ are radicals selected from the group consisting of alkyl, aryl, aralkyl, and alkaryl radicals having 1 to 20 carbon atoms.

3. A wax oxidate salt characterized by having a nitrogen content of about 2.5% to 4% prepared by reacting the naphtha-soluble portion of a paraffin wax oxidate at a temperature from about 212° F. to about 280° F., said oxidate having an acid No. above about 190 and an acid No. to saponification No. ratio greater than about 0.6, with a quaternary ammonium hydroxide represented by the formula:

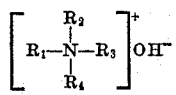

in which $R_1$, $R_2$, $R_3$, and $R_4$ are radicals selected from the group consisting of alkyl, aryl, aralkyl and alkaryl radicals having from 1 to 20 carbon atoms.

4. A product according to claim 1 wherein said quaternary ammonium hydroxide is benzyltrimethylammonium hydroxide.

5. A product according to claim 1 in which the quaternary ammonium hydroxide is tetraethylammonium hydroxide.

6. A product according to claim 1 in which the quaternary ammonium hydroxide is phenyltrimethylammonium hydroxide.

7. A method of preparing a corrosion inhibiting wax oxidate salt which comprises reacting a paraffin wax oxidate, said oxidate having an acid No. above about 190 and an acid No. to saponification No. ratio greater than about 0.6, with a quaternary ammonium hydroxide represented by the formula:

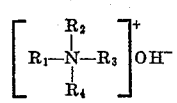

in which $R_1$, $R_2$, $R_3$, and $R_4$ are radicals selected from the group consisting of alkyl, aryl, aralkyl and alkaryl radicals having 1 to 20 carbon atoms at a temperature sufficient to volatilize water from the reaction mixture.

8. A method of preparing a corrosion inhibiting wax oxidate salt which comprises reacting the naphtha-soluble portion of a paraffin wax oxidate at a temperature from about 212° F. to about 280° F., said oxidate having an acid No. above about 190 and an acid No. to saponification No. ratio greater than about 0.6, with a quaternary ammonium compound represented by the formula:

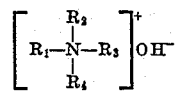

in which $R_1$, $R_2$, $R_3$ and $R_4$ are radicals selected from the group consisting of alkyl, aryl, aralkyl, and alkaryl radicals having 1 to 20 carbon atoms.

9. A process for inhibiting the corrosion of metals induced by aqueous solutions which comprises injecting a quaternary ammonium salt into said solutions, said salt prepared by reacting a paraffin wax oxidate at a temperature from about 212° F. to about 280° F., said oxidate having an acid No. above about 190 and an acid No. to saponification No. ratio greater than about 0.6, with a quaternary ammonium hydroxide represented by the formula:

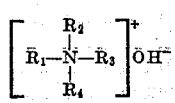

in which $R_1$, $R_2$, $R_3$ and $R_4$ are radicals selected from the group consisting of alkyl, aryl, aralkyl and alkaryl radicals having from 1 to 20 carbon atoms.

10. A product according to claim 3 in which said quaternary ammonium hydroxide is benzyltrimethylammonium hydroxide.

11. A product according to claim 3 in which said quaternary ammonium hydroxide is tetraethylammonium hydroxide.

12. A process according to claim 9 in which said quaternary ammoniumhydroxide is benzyltrimethylammonium hydroxide.

13. A method of preparing a benzyltrimethylammonium waxate characterized by having a nitrogen content from about 2.5% to 4% which comprises reacting a paraffin wax oxidate at a temperature from about 212° F. to about 280° F., said oxidate having an acid No. above about 190 and an acid No. to saponification No. ratio greater than about 0.6, with benzyltrimethyl ammonium hydroxide.

14. A process for inhibiting the corrosion of metals induced by brine solutions which comprises injecting a quaternary ammonium salt into said solution, said salt prepared by reacting a paraffin wax oxidate, said oxidate having an acid No. above about 190 and an acid No. to saponification No. ratio greater than about 0.6, with a quaternary ammonium hydroxide represented by the formula:

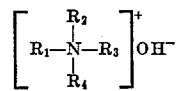

in which $R_1$, $R_2$, $R_3$ and $R_4$ are radicals selected from the group consisting of alkyl, aryl, aralkyl and alkaryl radicals having from 1 to 20 carbon atoms at a temperature sufficient to volatilize water from the reaction mixture.

15. A process according to claim 14 in which said quaternary ammonium hydroxide is benzyltrimethylammonium hydroxide and said injection is at a rate of 4 gallons per barrel of brine production per day.

16. A process for inhibiting the corrosion induced by solutions containing sulfate-reducing bacteria which comprises adding about 10 to about 100 parts per million to said solutions of a quaternary ammonium salt, said salt prepared by reacting a paraffin wax oxidate at a temperature from about 212° F. to about 280° F., said oxidate having an acid No. above about 190 and an acid No. to saponification No. ratio greater than about 0.6, with a quaternary ammonium hydroxide represented by the formula:

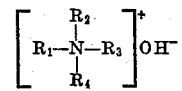

in which $R_1$, $R_2$, $R_3$ and $R_4$ are radical selected from the group consisting alkyl, aryl, aralkyl and alkaryl radicals having from 1 to 20 carbon atoms.

17. A process according to claim 16 in which said quaternary ammonium hydroxide is benzyltrimethylammonium hydroxide.

(References on following page)

References Cited in the file of this patent

UNITED STATES PATENTS

| | | |
|---|---|---|
| 2,262,720 | Earle | Nov. 11, 1941 |
| 2,373,938 | Burwell | Apr. 17, 1945 |
| 2,443,569 | Ruggles | June 15, 1948 |
| 2,486,454 | Zellner | Nov. 1, 1949 |
| 2,486,455 | Zellner | Nov. 1, 1949 |
| 2,487,909 | Van Bramer | Nov. 15, 1949 |
| 2,695,303 | Buckmann | Nov. 23, 1954 |
| 2,733,206 | Prusick et al. | Jan. 31, 1956 |
| 2,745,809 | Cardwell et al. | May 15, 1956 |

FOREIGN PATENTS

| | | |
|---|---|---|
| 49,879 | Netherlands | Feb. 15, 1941 |

OTHER REFERENCES

World Oil, April 1955, pp. 242, 244 and 245 (article by La Susa).